US008246175B2

(12) United States Patent
 Takezawa

(10) Patent No.: US 8,246,175 B2
(45) Date of Patent: Aug. 21, 2012

(54) LIGHTING DEVICE, LIGHT SOURCE DEVICE, PROJECTOR, AND DISCHARGE LAMP LIGHTING METHOD

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 500 days.

(21) Appl. No.: 12/628,434

(22) Filed: Dec. 1, 2009

(65) Prior Publication Data

US 2010/0134766 A1    Jun. 3, 2010

(30) Foreign Application Priority Data

Dec. 3, 2008    (JP) .................................. 2008-308558

(51) Int. Cl.
    *G03B 21/20*    (2006.01)
(52) U.S. Cl. ................ 353/85; 353/31; 353/98; 353/99; 353/122; 315/224; 315/225; 315/226; 315/246
(58) Field of Classification Search .................... 353/31, 353/85, 98, 99, 122; 315/308, 291, 362, 315/128, 82, DIG. 7, 224, 225, 226, 209 M, 315/246, 283; 313/484, 573, 586, 595, 601, 313/602, 594, 591, 234; 348/65, 75, 607, 348/771, 739, 811; 349/5, 7, 8, 9
See application file for complete search history.

(56) References Cited

U.S. PATENT DOCUMENTS

| 5,463,287 | A | * | 10/1995 | Kurihara et al. | ............... 315/307 |
| 6,127,789 | A | * | 10/2000 | Ishizuka et al. | ............... 315/308 |
| 6,781,328 | B2 | * | 8/2004 | Horiuchi et al. | ............... 315/291 |
| 6,888,321 | B2 |  | 5/2005 | Arimoto et al. |  |
| 7,400,100 | B2 | * | 7/2008 | Takezawa | ...................... 315/307 |
| 7,511,433 | B2 | * | 3/2009 | Okawa | .......................... 315/224 |
| 7,622,869 | B2 | * | 11/2009 | Watanabe et al. | .............. 315/291 |
| 2008/0192210 | A1 | * | 8/2008 | Ushiyama | ........................ 353/85 |
| 2008/0198337 | A1 | * | 8/2008 | Kitagawa | ........................ 353/85 |
| 2009/0001904 | A1 |  | 1/2009 | Okawa |  |

FOREIGN PATENT DOCUMENTS

| JP | 2004-039391 A | 2/2004 |
| JP | 2007-149361 A | 6/2007 |
| JP | 2009-009885 A | 1/2009 |

* cited by examiner

*Primary Examiner* — Georgia Y Epps
*Assistant Examiner* — Sultan Chowdhury
(74) *Attorney, Agent, or Firm* — AdvantEdge Law Group, LLC

(57) ABSTRACT

A lighting device that lights a discharge lamp which contains a pair of electrodes and light emission substance including mercury, includes: a first terminal connected with the electrode to which mercury easily adheres, and a second terminal connected with the electrode to which mercury is difficult to adhere; a setting unit which sets AC current supplied to the first and second terminals in a starting period from insulation break down of the discharge lamp until start of discharge between the tips of the pair of the electrodes; and a supplying unit which supplies AC current set by the setting unit to the first and second terminals, wherein the setting unit sets AC current such that the half-cycle electric quantity supplied to the first terminal becomes larger than the half-cycle electric quantity supplied to the second terminal in the initial term of the starting period under the condition in which the first terminal initially operates as cathode, and that the half-cycle electricity quantities supplied to the first and second terminals become substantially equal in the final term of the starting period.

16 Claims, 7 Drawing Sheets

LIGHTING DEVICE, LIGHT SOURCE DEVICE, PROJECTOR, AND DISCHARGE LAMP LIGHTING METHOD

BACKGROUND

1. Technical Field

The present invention relates to a lighting device for lighting a discharge lamp, a light source device including the lighting device and a discharge lamp, a projector including the light source device, and a discharge lamp lighting method.

2. Related Art

A discharge lamp which includes an arc tube having a light emission portion and a pair of sealing portions such as extra-high pressure mercury lamp is known. The light emission portion has a discharge space accommodating a pair of electrodes. The sealing portions extend in directions away from each other with the light emission portion located between the sealing portions, and each of the sealing portions contains an electrode extension line connected with the corresponding electrode. Light emitting substances containing mercury, rare gas and the like are sealed into the discharge space of the discharge lamp. The mercury adheres to one of the pair of the electrodes disposed within the discharge space, which electrode is more easily cooled when the discharge lamp is turned off. Discharge phenomenon until stabilization of arc discharge is affected by this adhesion of mercury.

More specifically, in the initial stage of arc discharge, first, arc discharge on mercury having low work function starts, and then arc discharge on the electrodes made of tungsten starts after the temperature of tungsten reaches a temperature sufficient for thermionic emission (thermionic emission temperature). The actions during this period are affected by the condition of mercury adhesion and the corresponding electron emission. In case of electron emission which does not agree with mercury adhesion under the condition that the temperature of the tungsten electrode does not reach the thermionic emission temperature, mixture of glow discharge and arc discharge is generated. In this case, the tungsten electrodes are subject to cathode sputtering, thereby producing excessive tungsten condition inside the container of the light emission portion. This condition leads to blacking phenomenon which causes adhesion of tungsten to the inner wall of the container of the light emission portion, and thus shortens the life of the discharge lamp.

A high-pressure discharge lamp lighting device is known as a lighting control device for controlling lighting of the discharge lamp. This high-pressure discharge lamp lighting device applies AC rectangular wave voltage at the start of light emission of the discharge lamp, applies DC voltage at the time of transition from glow discharge to arc discharge, and applies AC rectangular wave voltage at the time of steady lighting (For example, see JP-A-2004-39391).

The high-pressure discharge lamp lighting device disclosed in JP-A-2004-39391 applies high-frequency AC voltage at the start of light emission of the discharge lamp to supply current to the respective electrodes according to the polarity inversion. Then, the high-pressure discharge lamp lighting device applies DC voltage to increase the temperatures of the respective electrodes, thereafter applies AC voltage to achieve steady lighting in a stable manner.

When AC current is supplied to the discharge lamp in the starting period of the discharge lamp in the manner shown in JP-A-2004-39391 under the condition in which mercury is only adhering to the electrode easily cooled during turned-off time of the discharge lamp, asymmetric current (half-wave current) drive is easily produced in which continuity of only one-directional current is recognized between the electrode having mercury adhesion and the electrode having no mercury adhesion. In this case, lighting startability of the discharge lamp lowers. When the period of the asymmetric current drive is long, electrons emitted from one electrode easily collide with the tube wall of the light emission portion. As a result, the constituent material of the tube wall (such as glass) evaporates. The constituent material evaporated in this manner changes the interior environment of the light emission portion, and causes considerable deterioration of the discharge lamp such as exhaustion of the electrodes. Therefore, a lighting device capable of improving lighting startability of a discharge lamp has been demanded.

SUMMARY

It is an advantage of some aspects of the invention to provide a lighting device, alight source device, a projector, and a discharge lamp lighting method capable of improving lighting startability of a discharge lamp.

A lighting device that lights a discharge lamp which contains a pair of electrodes and light emission substance including mercury according to a first aspect of the invention includes: a first terminal connected with the electrode to which mercury easily adheres as one of the pair of the electrodes, and a second terminal connected with the electrode to which mercury is difficult to adhere as the other electrode; a setting unit which sets AC current supplied to the first and second terminals in a starting period from insulation break down of the discharge lamp until start of discharge between the tips of the pair of the electrodes; and a supplying unit which supplies AC current set by the setting unit to the first and second terminals. The setting unit sets AC current such that the half-cycle electric quantity supplied to the first terminal becomes larger than the half-cycle electric quantity supplied to the second terminal in the initial term of the starting period under the condition in which the first terminal initially operates as cathode, and that the half-cycle electricity quantities supplied to the first and second terminals become substantially equal in the final term of the starting period.

According to this structure, the half-cycle electricity quantity of the AC current supplied to the terminal connected with the electrode to which mercury easily adheres in the initial term of the starting period of the discharge lamp becomes larger than that quantity supplied to the terminal connected with the electrode to which mercury is difficult to adhere. Mercury has low work function and easily emits electrons. Thus, many electrons can be emitted from mercury adhering to the electrode, and increase in the temperature of the electrode having no adhesion of mercury can be promoted.

When the temperature of the electrode having no adhesion of mercury reaches a temperature sufficient for thermionic emission (thermionic emission temperature) by collision of electrons from mercury, electrons are also emitted from this electrode. As a result, mercury adhering to the electrode evaporates by collision with these electrons. The temperature of the electrode from which adhering mercury evaporates is lower than the temperature of the electrode having already emitted electrons. Thus, electrons from the electrode exposed by evaporation of mercury are not easily emitted.

However, in the final term of the starting period, the half-cycle electricity quantity supplied to the respective terminals become substantially equal. That is, the emission amount of electrons from the electrode having already emitted electrons (electrode to which mercury is difficult to adhere) becomes larger than that amount emitted in the initial term of the starting period. Thus, the temperature of the exposed electrode (electrode having adhesion of mercury) can be rapidly raised by collision of emitted electrons.

As a result, the starting period of the discharge lamp can be shortened, and the condition can speedy shift to the steady lighting condition. Accordingly, the lighting startability of the discharge lamp can be improved. Moreover, the damage to the discharge lamp is reduced, and deterioration of the electrodes is decreased by reduction of the starting period. Thus, the life of the discharge lamp can be increased.

It is preferable that the setting unit increases the half-cycle electricity quantity supplied to the second terminal step by step during the starting period.

According to this structure, the half-cycle electricity quantity supplied to the second terminal increases as the term shifts from the initial term to the final term in the starting period of the discharge lamp. In this case, a number of electrons collide with the electrode exposed by evaporation of mercury adhering to the electrode according to the evaporation condition of mercury, and the temperature of the electrode increases accordingly. Thus, rising of the temperatures of the respective electrodes can be further promoted, and the lighting startability of the discharge lamp can be further improved.

It is preferable that the setting unit sets the half-cycle electricity quantity of the AC current supplied from the supplying unit while controlling at least either frequency or current value of the AC current.

Control over the half-cycle electricity quantity can be achieved by controlling at least any of current, voltage, and frequency (half-cycle width). In these factors, voltage determined by the characteristics of the discharge lamp is difficult to be intentionally controlled.

According to this structure, however, the half-cycle electricity quantity supplied to the respective terminals can be easily determined by controlling at least either frequency (i.e., half-cycle width) or current value of AC current supplied to the respective terminals. Thus, AC current supply to the respective terminals can be easily controlled.

It is preferable that the frequency of the AC current set by the setting unit is higher than 5 Hz. More specifically, it is preferable that the frequency of the AC current set by the setting unit is higher than 5 Hz and lower than 500 Hz.

The time required until the inner wall of the discharge lamp is damaged by continuous collision of electrons emitted from an electrode against the inner wall is considered to be 0.1 second or longer. Thus, damage of the inner wall can be reduced by setting frequency of AC current supplied to the respective terminals at a frequency higher than 5 Hz (half-cycle: 0.1 second) even when electrons emitted from one electrode continuously collide with the inner wall of the discharge lamp. Thus, deterioration of the discharge lamp can be prevented.

When the frequency of AC current is set higher than 500 Hz, the asymmetric current (half-wave current) drive discussed above is easily caused. Thus, appropriate supply of current to the respective electrodes with reduction of deterioration of the discharge lamp can be achieved by setting the frequency in the range higher than 5 Hz and lower than 500 Hz.

It is preferable that the discharge lamp includes a light emission portion into which the pair of the electrode and the light emission substance are sealed, and a reflection member which covers the end of the light emission portion on the side where one of the pair of the electrodes is disposed. Also, the first terminal is connected with the electrode disposed on the side opposite to the side where the reflection member is provided.

According to this structure, light emitted from the light emission portion toward the reflection member can be reflected to the side opposite to the reflection member side by using the reflection member covering one end of the light emission portion. In this case, the traveling direction of light emitted from the light emission portion can be regulated on the side opposite to the reflection member side. Thus, utilization efficiency of the light can be improved.

When the reflection member is provided, the temperature of the light emission portion on the reflection member side is maintained by the reflection member at the time of turned-off of the discharge lamp. In this case, the electrode located on the side where is provided with the reflection member is not easily cooled, but the other electrode is easily cooled. Under this condition, mercury easily adheres to the other electrode. Thus, the terminal connected with the electrode to which mercury easily adheres is determined as the first terminal so as to supply current having large half-cycle electricity quantity to the electrode to which mercury easily adheres in the initial term of the starting period of the discharge lamp.

Accordingly, the lighting startability of the discharge lamp can be improved, and the usability of the discharge lamp can be enhanced.

A light source device according to a second aspect of the invention includes: a discharge lamp which contains a pair of electrodes and light emission substance including mercury; and the lighting device described above.

According to this structure, advantages similar to those of the lighting device can be provided. Moreover, the half-cycle electricity quantity supplied to the respective electrodes can be set according to the characteristics of the discharge lamp included in the light source device. Thus, the lighting startability of the discharge lamp can be further improved.

A projector according to a third aspect of the invention includes: the light source device described above; a light modulation device which modulates light emitted from the light source device according to image information; and a projection device which projects the modulated light.

According to this structure, advantages similar to those of the light source device can be provided. Moreover, the life of the discharge lamp can be increased by improvement over the lighting startabiligy of the discharge lamp. Thus, the necessity for frequently replacing the light source device can be eliminated, and labor required for maintenance of the projector can be reduced.

A discharge lamp lighting method for lighting a discharge lamp including a light emission portion which contains a pair of electrodes and light emission substance including mercury according to a fourth aspect of the invention includes: supplying AC current to terminals such that the half-cycle electric quantity supplied to one of the terminals connected with the electrode to which mercury easily adheres becomes larger than the half-cycle electric quantity supplied to the other terminal in the initial term of a starting period from insulation break down of the discharge lamp until start of discharge between the tips of the pair of the electrodes under the condition in which the one terminal initially operates as cathode, and that the half-cycle electricity quantities supplied to the respective terminals become substantially equal in the final term of the starting period.

According to this method, advantages similar to those of the lighting device can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

A first embodiment according to the invention is hereinafter described with reference to the drawings.

General Structure of Projector

Figure 1:
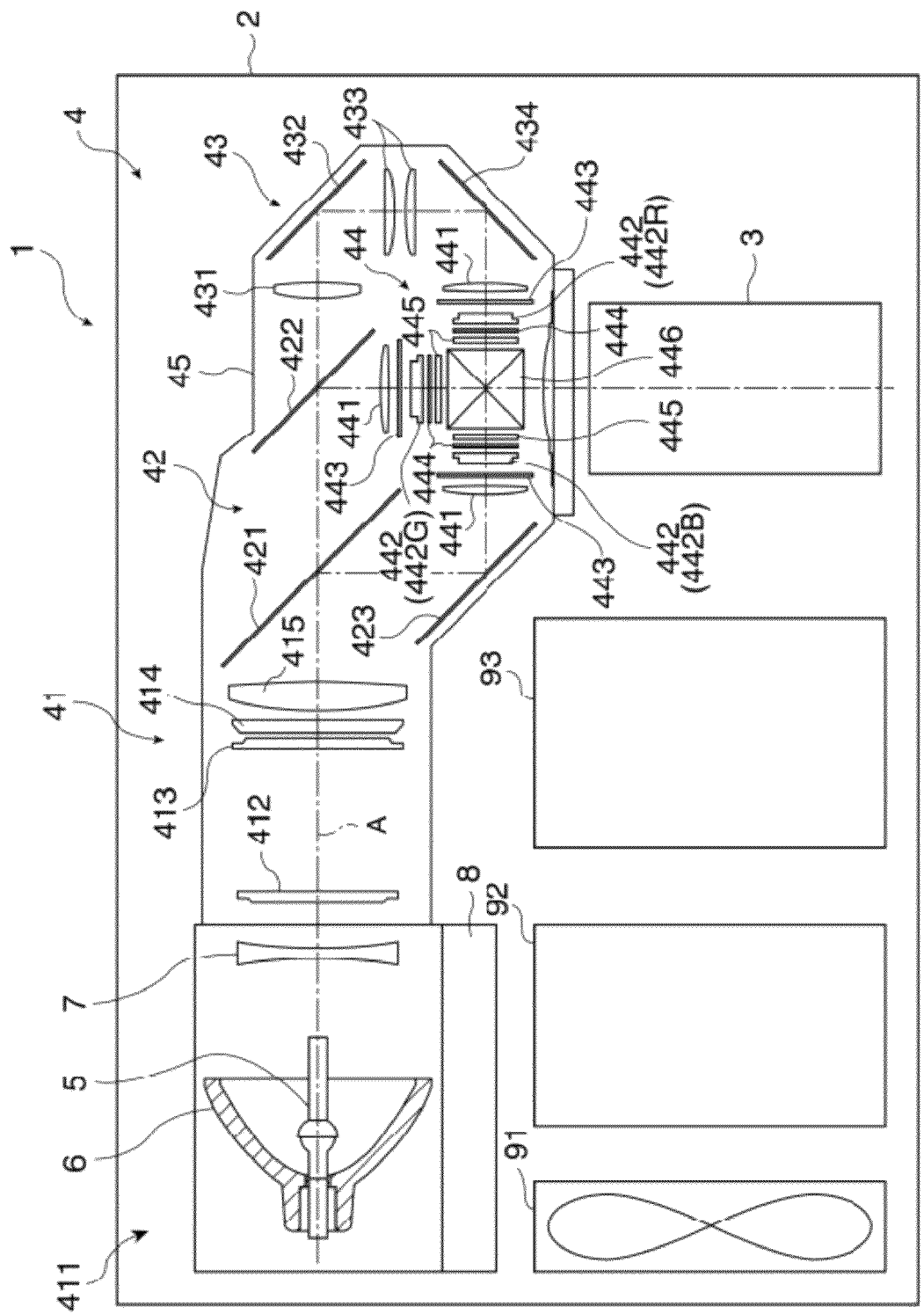
FIG. 1 schematically illustrates a general structure of a projector according to a first embodiment of the invention.

FIG. 1 schematically illustrates a general structure of a projector 1 according to this embodiment.

The projector 1 forms image light by modulating light emitted from a light source device 411 provided inside the projector 1 according to image information, and expands and projects the image light onto a projection surface such as screen (not shown). The projector 1 includes an outer housing 2, a projection lens 3, an optical unit 4, and other components as illustrated in FIG. 1.

The projector 1 further includes a cooling unit 91 having a cooling fan and the like for cooling the interior of the projector 1, a power source unit 92 for supplying power to the respective components inside the projector 1, a control unit 93 for controlling the entire structure of the projector 1, and other units inside the outer housing 2.

Structures of Outer Housing and Projection Lens

The outer housing 2 for accommodating the projection lens 3, the optical unit 4, and other components has substantially rectangular parallelepiped shape as a whole. The outer housing 2 is made of synthetic resin in this embodiment, but may be made of other material such as metal.

The projection lens 3 is a projection device which forms an image on the projection surface such as screen (not shown) by using image light produced by the optical unit 4, and expands and projects the image of the image light. The projection lens 3 is a combined lens constituted by plural lenses accommodated within a cylindrical lens-barrel.

Structure of Optical Unit

The optical unit 4 is a unit for forming image light corresponding to image information under the control of the control unit 93. The optical unit 4 has substantially L shape in the plan view which extends along the back surface of the outer housing 2 and along the side surface of the outer housing 2.

The optical unit 4 includes an illumination device 41, a color division device 42, a relay device 43, an optical device 44, and an optical component housing 45 which accommodates these devices 41 through 44 and supports and fixes the projection lens 3 at a predetermined position.

The illumination device 41 provides substantially uniform illumination to an image forming area of liquid crystal panels 442 described later. The illumination device 41 has a light source device 411, a pair of lens arrays 412 and 413, a polarization conversion element 414, and a superimposing lens 415.

The light source device 411 has a discharge lamp 5 for emitting radial light, a main reflection mirror 6 for reflecting radial light emitted from the discharge lamp 5 to converge the light at a predetermined position, a collimating concave lens 7 for collimating the light reflected and converted by the main reflection mirror 6 such that the light travels parallel with an illumination optical axis A, a housing (not shown) for accommodating these components 5 through 7, and a lighting device 8 for lighting the discharge lamp 5. The details of the discharge 5, the main reflection mirror 6, and the lighting device 8 will be described later.

The color division device 42 includes dichroic mirrors 421 and 422 and a reflection mirror 423. The relay device 43 has an entrance side lens 431, relay lenses 433, and reflection mirrors 432 and 434.

The optical device 44 includes field lenses 441, three liquid crystal panels 442 (red light liquid crystal panel 442R, green light liquid crystal panel 442G, and blue light liquid crystal panel 442B) as light modulation devices, three entrance side polarization plates 443, three visibility angle compensation plates 444, three exit side polarization plates 445, and a cross dichroic prism 446 as a color combining device.

In the optical unit 4 having this structure, light emitted from the illumination device 41 and having equalized illuminance within the illumination area is divided into three color lights in R (red), G (green), and B (blue) by the color division device 42. The respective color lights thus divided are modulated by the corresponding liquid crystal panels 442 according to image information to form image lights for the respective color lights. Then, the image lights for the respective color lights are combined by the cross dichroic prism 446, and expanded and projected on the projection surface by the projection lens 3.

Structure of Discharge Lamp

Figure 2:
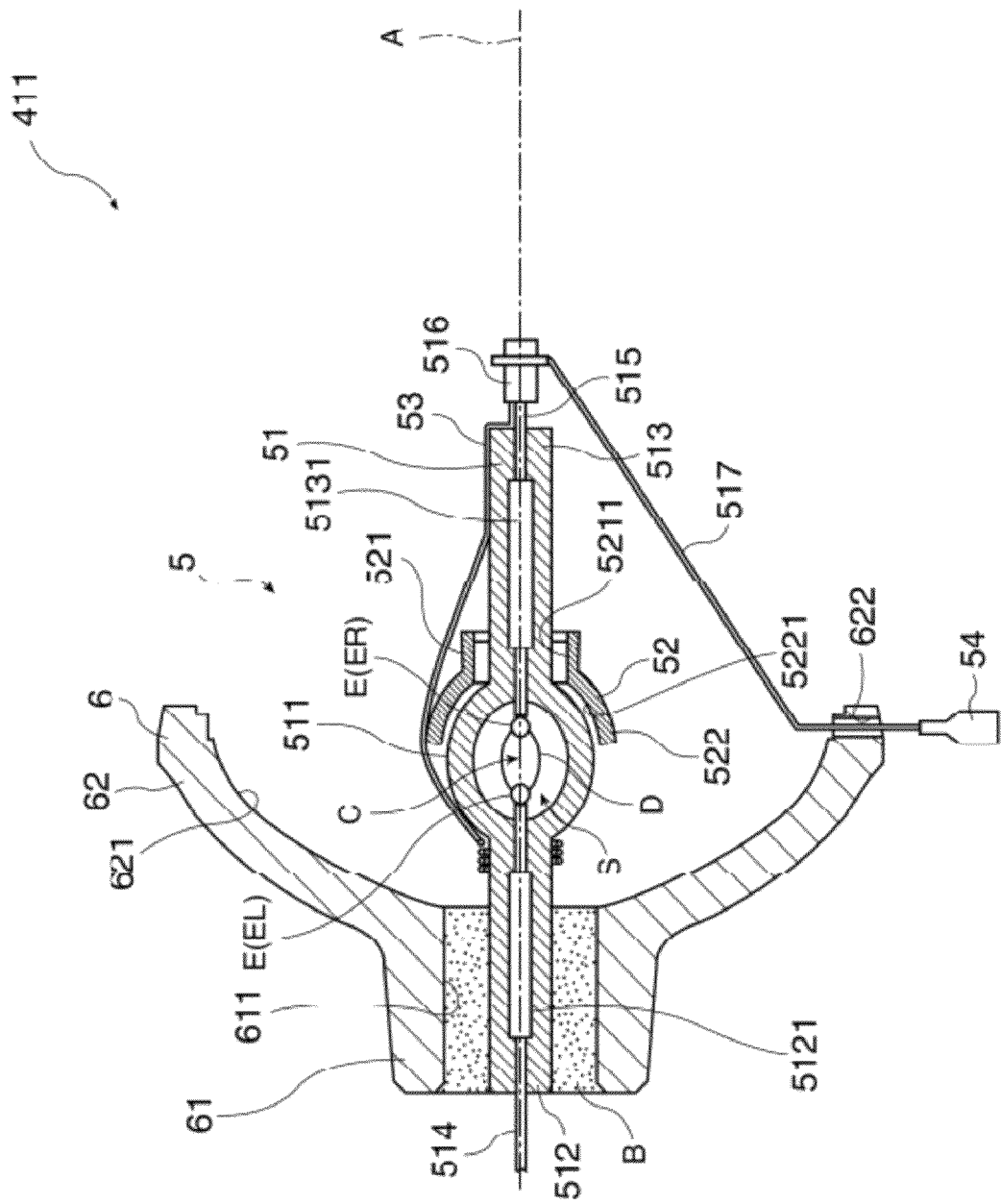
FIG. 2 is a vertical cross-sectional view illustrating a light source device according to the first embodiment.

FIG. 2 is a vertical cross-sectional view illustrating the light source device 411. FIG. 2 shows the discharge lamp 5 and the main reflection mirror 6 constituting the light source device 411, but does not show the collimating concave lens 7, the housing, and the lighting device 8.

The discharge lamp 5 is a light source which emits light by current supplied from the lighting device 8 described later, and includes an arc tube 51 made of quartz glass, and a sub reflection mirror 52 and a trigger line 53 attached to the arc tube 51. The discharge lamp 5 is constituted by a discharge light source lamp of various types capable of emitting high-luminance light, such as metal halide lamp, high-pressure mercury lamp, and extra-high pressure mercury lamp.

Structure of Arc Tube

The arc tube 51 includes a light emission portion 511 disposed at the central portion of the arc tube 51 and expanded substantially in spherical shape, and a pair of sealing portions 512 and 513 extending from both ends of the light emission portion 511 in directions away from each other with the light emission portion 511 located between the sealing portions 512 and 513 (sealing portion 512 on the left side, and sealing portion 513 on the right side in FIG. 2).

A pair of electrodes E (electrode EL on the sealing portion 512 side, and electrode ER on the sealing portion 513 side) are disposed within the light emission portion 511, and a discharge space S into which light emission substances containing mercury, rare gas, and a small quantity of halogen are sealed is formed between the pair of the electrodes E.

Metal foils 5121 and 5131 made of molybdenum and electrically connected with the electrodes EL and ER inside the light emission portion 511 are inserted into the pair of the sealing portions 512 and 513. The ends of the pair of the sealing portions 512 and 513 on the side opposite to the light emission portion 511 side are closed by glass material or the like. Electrode extension lines 514 and 515 are also connected with the respective metal foils 5121 and 5131, and extend to the outside of the arc tube 51. When current is supplied to the electrode extension lines 514 and 515 from the lighting device 8 described later, potential difference is generated between the electrodes EL and ER via the metal foils 5121 and 5131. As a result, arc image D is produced by generation of discharge, and the interior of the light emission portion 511 emits light.

Structure of Main Reflection Mirror

The details of the main reflection mirror 6 are now discussed.

The main reflection mirror 6 corresponds to a reflection mirror according to the invention. The main reflection mirror 6 is a molded one-unit component which is made of glass and reflects entering light to converge the light at a second focus on the illumination optical axis A. The main reflection mirror 6 is fixed to the sealing portion 512 by adhesive B. The main reflection mirror 6 having this structure includes a substantially cylindrical neck-shaped portion 61 into which the sealing portion 512 is inserted, and a reflection portion 62 having concave curved surface extending from the neck-shaped portion 61.

A reflection surface 621 on which metal thin film is deposited is formed on the rotational-curve-shaped surface of the reflection portion 62 on the side facing the light emission portion 511. The reflection surface 621 is formed as cold mirror which reflects visible light and transmits infrared light and ultraviolet light.

The neck-shaped portion 61 has an opening 611 which has substantially circular shape in the plan view and into which the sealing portion 512 is inserted. The adhesive B is injected into the opening 611 with the sealing portion 512 inserted into the opening 611 to fix the sealing portion 512 and the main reflection mirror 6 by adhesive. In this case, the positions of the discharge lamp 5 and the main reflection mirror 6 are determined such that a center position C of the arc image D in the light emission portion 511 of the discharge lamp 5 is located in the vicinity of a first focus of the reflection surface 621.

According to this embodiment, the main reflection mirror 6 is constituted by an ellipsoidal reflector having spheroidal surface. However, the main reflection mirror 6 may be a parabolic reflector having paraboloidal surface. In this case, the collimating lens 7 is eliminated. Alternatively, the main reflection mirror 6 may be constituted by a free-curve surface reflector.

Structure of Sub Reflection Mirror

The sub reflection mirror 52 corresponds to a reflection member according to the invention. The sub reflection mirror 52 is a molded glass component covering the light emission portion 511 on the sealing portion 513 side. The sub reflection mirror 52 is made of material similar to that of the arc tube 51. The sub reflection mirror 52 includes a substantially cylindrical neck-shaped portion 521 having an opening 5211 through which the sealing portion 513 is inserted, and a reflection portion 522 expanded from the neck-shaped portion 521.

The reflection portion 522 is disposed in such a position as to cover the light emission portion 511 on the sealing portion 513 side when the sub reflection mirror 52 is attached to the sealing portion 513. The reflection portion 522 has substantially bowl shape following the outer shape of the light emission portion 511. A reflection surface 5221 is formed on the surface of the reflection portion 522 opposed to the light emission portion 511. The reflection surface 5221 is provided as cold mirror which reflects visible light and transmits infrared light and ultraviolet light.

By the function of the sub reflection mirror 52 attached to the arc tube 51, light emitted from the light emission portion 511 toward the side opposite to the main reflection mirror 6 side is reflected by the reflection surface 5221 to reach the reflection surface 621 of the main reflection mirror 6. Then, the light is reflected by the reflection surface 621 to be converged at the second focus similarly to light directly traveling from the light emission portion 511 to the reflection surface 621. By this method, generation of light directly emitted from the light emission portion 511 toward the end of the light source device 411 in the light emission direction and not entering the lens array 412 disposed downstream from the light source device 411 on the optical path can be prevented.

In addition, the temperature of the electrode ER can be maintained by covering the sealing portion 513 (i.e., the electrode ER) of the light emission portion 511 by the sub reflection mirror 52. In this case, the electrode ER is difficult to be cooled, and the electrode ER side is easily cooled at the turned-off time of the discharge lamp 5. Thus, the mercury contained in the discharge substances easily adheres to the electrode EL. That is, the electrode EL corresponds to an electrode to which mercury easily adheres, and the electrode ER corresponds to an electrode to which mercury is difficult to adhere according to the invention.

Structure of Trigger Line

The trigger line 53 is a starting supplementary line for improving lighting startability of the arc tube 51. One end of the trigger line 53 is wound around the sealing portion 512 in coil shape. The center of the trigger line 53 is disposed along and outside the light emission portion 511, the sub reflection mirror 52, and the sealing portion 513. The other end of the trigger line 53 is connected with the electrode extension line 515 via a connection portion 516. The connection portion 516 is connected with one end of a lead 517 extending through an insertion hole 622 formed in the vicinity of the reflection portion 62 of the main reflection mirror 6 to the outside of the main reflection mirror 6. The other end of the lead 517 is connected with a terminal 54 for applying voltage to the electrode extension line 515 and the trigger line 53.

The lighting startability of the discharge lamp 5 can be increased by applying high pulse voltage to the trigger line 53 having this structure.

Structure of Lighting Device

Figure 3:
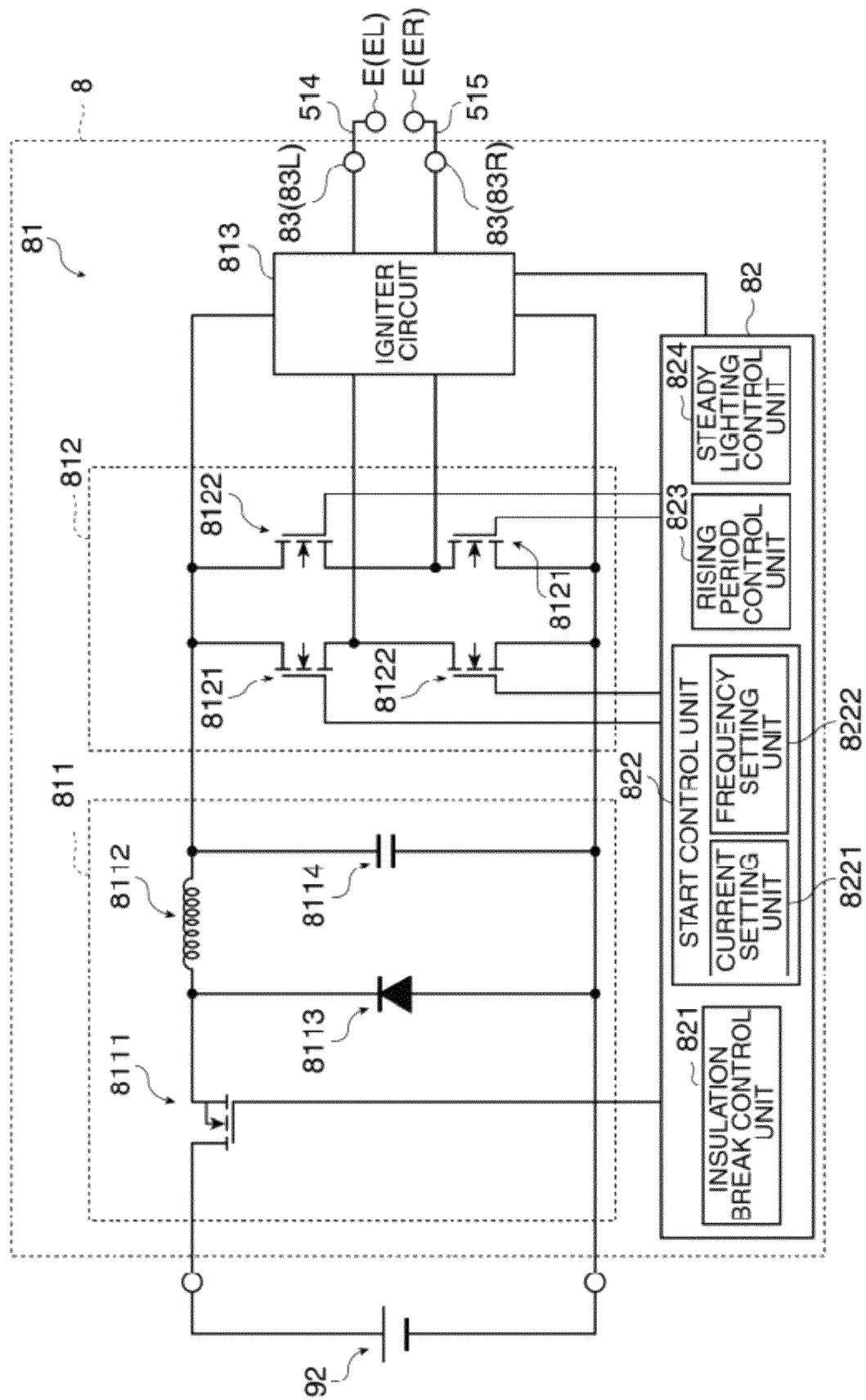
FIG. 3 schematically illustrates a structure of a lighting device according to the first embodiment.

FIG. 3 schematically illustrates the structure of the lighting device 8.

The lighting device 8 constituted by plural circuit elements supplies current to the respective electrodes E of the discharge lamp 5 to control lighting. As illustrated in FIG. 3, the lighting device 8 has a supply device 81, a control device 82, and terminals 83.

The terminals 83 are connectors having a pair of terminals 83L and 83R connected with the electrode extension lines 514 and 515, respectively. The terminal 83L corresponds to a first terminal according to the invention which connects the electrode EL to which mercury easily adheres (electrode EL easily cooled at the turned-off time) via the electrode extension line 514. The terminal 83R corresponds to a second terminal according to the invention which connects with the electrode ER to which mercury is difficult to adhere (electrode ER difficult to be cooled at the turned-off time) via the electrode extension line 515.

Structure of Supply Device

The supply device 81 corresponds to a supplying unit according to the invention. The supply device 81 converts DC current supplied from the power source unit 92 into AC current and supplies the AC current to the respective electrodes E to turn on the discharge lamp 5 under the control of the control device 82 described later. The supply device 81 includes a down chopper 811, an inverter bridge 812, and an igniter circuit 813.

The down chopper 811 is a circuit which reduces DC voltage of approximately 300V to 400V inputted from the power source unit 92 to voltage of approximately 50V to 150V appropriate for the discharge lamp 5. The down chopper 811 includes a switch element 8111 and a coil 8112 connected in series, a diode 8113 and a capacitor 8114 branched from these elements 8111 and 8112, respectively.

The switch element 8111 reduces DC voltage inputted from the power source unit 92 to desired voltage. The coil 8112, the diode 8113, and the capacitor 8114 function as elements for removal of high-frequency component from the inputted DC current, rectification, and conversion of the inputted DC voltage into constant power.

The inverter bridge 812 has function of converting DC current into AC rectangular wave current. The inverter bridge 812 is constituted by a bridge circuit having a pair of transistors 8121 and a pair of transistors 8122. The electrodes EL and ER are connected between the transistors 8121 and the transistors 8122 via the terminals 83L and 83R.

When a pulse signal is given to the transistors 8121 and 8122 from the control device 82 described later in response to input of DC current rectified by the down chopper 811 to the bridge circuit, a route containing the pair of the transistors 8121 and a route containing the pair of the transistors 8122 are alternately short-circuited. By resultant generation of current flow, AC rectangular wave current is started to be supplied to the electrodes E via the terminals 83 connected between the two routes.

The igniter circuit 813 is a circuit for promoting start of the discharge lamp 5 by causing insulation break down between the electrodes EL and ER. The igniter circuit 813 is connected between the discharge lamp 5 and the units of the down chopper 811 and the inverter bridge 812 in parallel with the discharge lamp 5.

Though not shown in detail in the figure, the igniter circuit 813 includes a high-voltage pulse generating circuit, and a pulse transformer whose primary side is connected with the high-voltage pulse generating circuit. The igniter circuit 813 boosts high-voltage pulse generated by the high-voltage pulse generating circuit on the secondary side of the pulse transformer, and applies the boosted voltage to the terminals 83 and further to the electrodes E to break insulation between the electrodes EL and ER. As a result, electric continuity is secured, and the discharge lamp 5 is started.

Structure of Control Device

The control device 82 outputs pulse signals to the switch element 8111 and the transistors 8121 and 8122 constituting the down chopper 811 and the inverter bridge 812 under the control of the control unit 93 to control ON/OFF conditions of the switch element 8111 and the transistors 8121 and 8122. The control device 82 further outputs starting signals to the igniter circuit 813 to control the operation of the supply device 81 and thereby control lighting of the discharge lamp 5. The control device 82 having these functions corresponds to a setting unit according to the invention, and includes an insulation break down control unit 821, a start control unit 822, a rising period control unit 823, and a steady lighting control unit 824.

Figure 4:
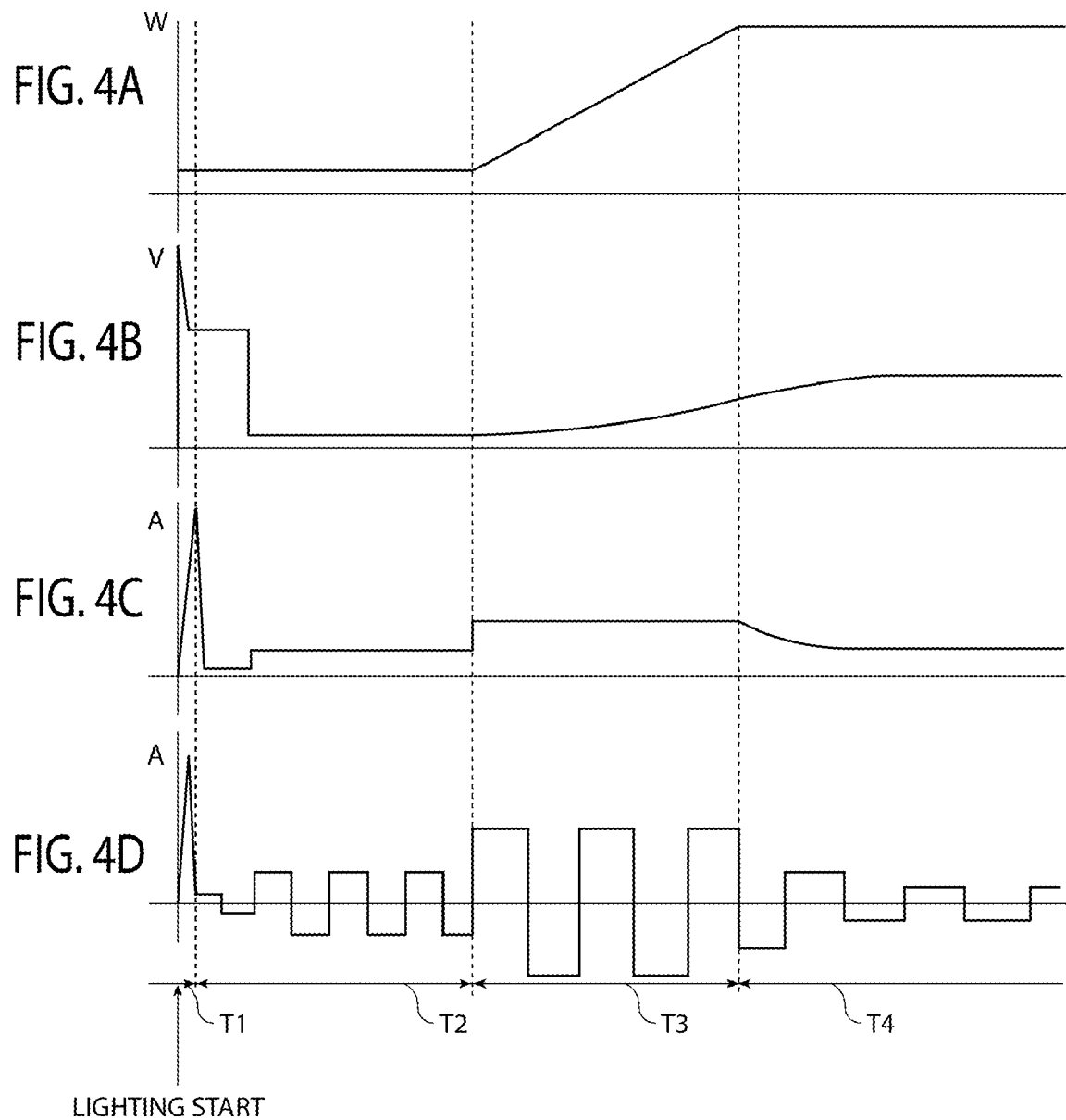
FIGS. 4A through 4D are graphs showing lamp power supplied to terminals according to the first embodiment.

FIGS. 4A through 4D are graphs showing lamp power supplied to the terminals 83. More specifically, FIG. 4A shows power change of the lamp power, FIG. 4B shows voltage change of the lamp power, FIG. 4C shows current change of the lamp power, and FIG. 4D shows waveform of the lamp power.

The respective function units 821 through 824 of the control device 82 set current value and frequency of current to be supplied to the discharge lamp 5 for each of an insulation break down period T1, a starting period T2, a rising period T3, a steady lighting period T4 shown in FIGS. 4A through 4D to control operation of the supply device 81. The voltage of the lamp power is set according to the types of the discharge lamp 5. The insulation break down control unit 821 allows the supply device 81 (particularly, igniter circuit 813) to apply high-voltage pulse to the respective terminals 83 such that insulation between the electrodes EL and ER can be broken.

Figure 5:
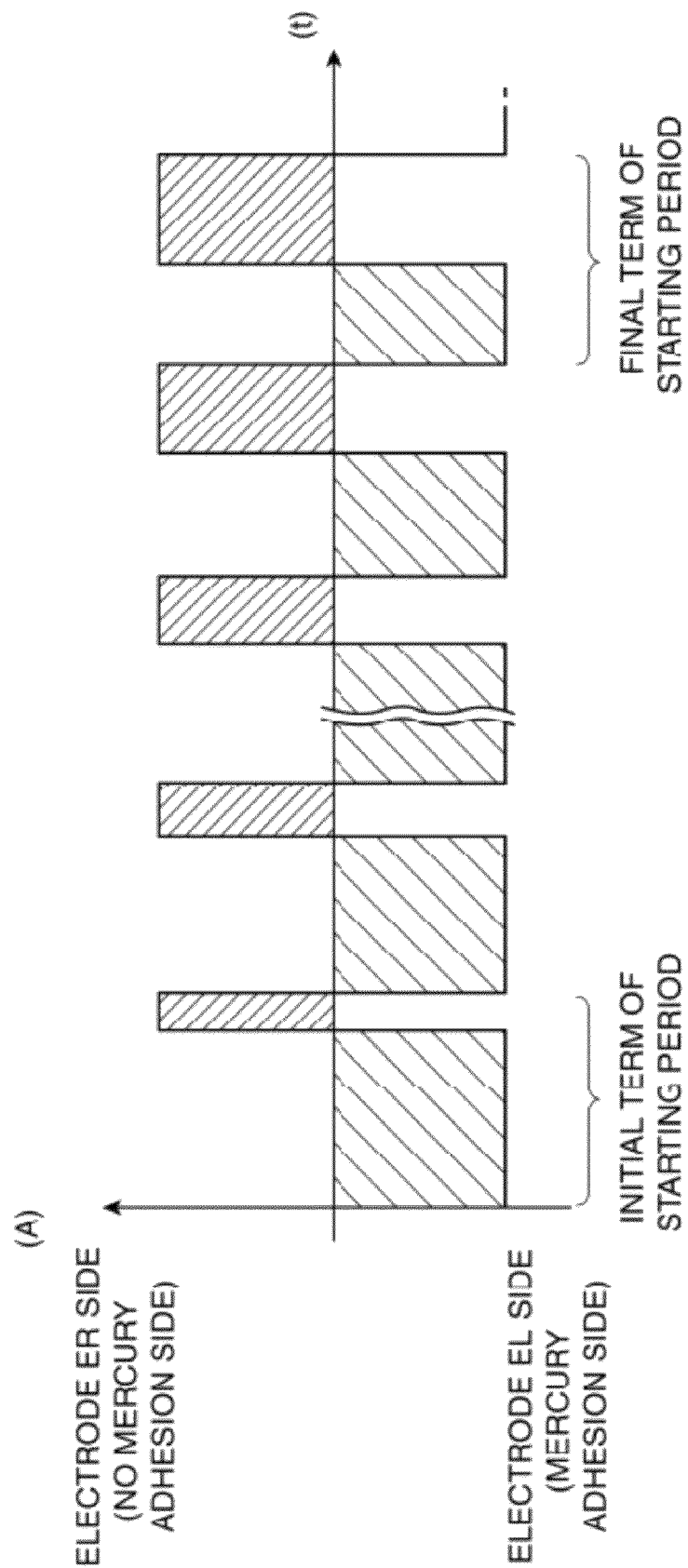
FIG. 5 shows waveform of current supplied to the terminals during a starting period according to the first embodiment.

FIG. 5 shows waveform of current supplied to the terminals 83 during the starting period T2.

The start control unit 822 operates during the starting period T2 provided for starting stable discharge (arc discharge) between the tips of the pair of the electrodes EL and ER from insulation break down (that is, the starting period T2 interposed between the end of the period T1 and the start of the rising period T3 as a period when the lamp power reaches rated power). The start control unit 822 includes a current setting unit 8221 for setting current value of AC current to be supplied to the terminals 83 from the supply device 81, and a frequency setting unit 8222 for setting frequency of the AC current. The start control unit 822 sets the half-cycle electricity quantity to be supplied to the respective terminals 83 during the starting period T2 by using the setting units 8221 and 8222.

More specifically, the start control unit 822 allows the supply device 81 to generate AC current shown in FIG. 5 and supply the generated AC current to the terminals 83. According to this AC current, the half-cycle electricity quantity supplied to the terminal 83L operating as cathode is larger than the half-cycle electricity quantity supplied to the terminal 83R operating as cathode in the initial term of the starting period T2 (the term when initial AC current is supplied to the terminal 83 by the control device 82 after insulation break down) under the condition in which the electrode EL, i.e., the terminal 83L initially operates as cathode, and the half-cycle electricity quantities supplied to the terminals 83L and 83R become equal in the final term of the starting period T2 (the term when stable arc discharge is initiated between the tips of the electrodes EL and ER).

For more details, the current value of the AC current is set at a constant value during the starting period T2 by the current setting unit 8221. However, the half-cycle width (pulse width) is set large on the cathode side (the term when the terminal 83L is cathode) and small on the anode side (the term when the terminal 83R is cathode) in the initial term of the starting period T2 by the frequency setting unit 8222. The half-cycle width gradually decreases on the cathode side and gradually increases on the anode side as the term shifts from the initial term to the final term in the starting period T2. The half-cycle widths on the cathode and the anode side are set equal in the final term of the starting period T2.

When the AC current is supplied to the respective terminals 83 in the starting period T2, current flows from the electrode ER having no adhesion of mercury to the electrode EL having adhesion of mercury during the previous turned-off time. As a result, electrons are emitted from mercury having lower work function (indicating "minimum energy required for extracting one electron from solid surface of metal or semiconductor to outside") than that of tungsten constituting the electrodes E toward the electrode ER. These electrons collide with the electrode ER, thereby raising the temperature of the electrode ER.

When the temperature of the electrode ER reaches a temperature necessary for electron emission, electrons are similarly emitted from the electrode ER and collide with the mercury adhering to the electrode EL. As a result, the temperature of the mercury adhering to the electrode EL rises, and thus the electrode EL is exposed by evaporation of the mercury. Since the electrode EL has been in the condition that electrons do not easily collide with the electrode EL by adhesion of mercury, the temperature of the electrode EL does not easily reach a temperature appropriate for emission of electrons immediately after the exposure.

Thus, as the term shifts to the final term of the starting period T2, the half-cycle electricity quantity supplied to the terminal 83L (indicated by oblique lines extending upward to the right in FIG. 5) decreases and the half-cycle electricity quantity supplied to the terminal 83R (indicated by oblique lines extending downward to the right in FIG. 5) increases to increase the volume of electron emission from the electrode ER. By this method, the adhering mercury evaporates, and temperature increase of the exposed electrode EL accelerates. Accordingly, the condition rapidly shifts to arc discharge between the tips of the electrodes EL and ER.

The frequency of the AC current supplied during the starting period T2 is set higher than 5 Hz and lower than 500 Hz. The frequency is higher than 5 Hz so as to prevent damage to the inner wall of the light emission portion 511 by switching between cathode and anode by half cycle shorter than the period for damaging the inner wall (0.1 second) even when electrons emitted from one electrode continuously collide with the inner wall. The frequency is set lower than 500 Hz so as to prevent damage to the inner wall of the light emission portion 511 by preventing continuous emission of electrons from one electrode which may be caused when the frequency is excessively high. When the frequency is extremely high, asymmetric current (half-wave current) drive in which only one-directional continuity of current is recognizable is easily produced. In this case, emission of electrons from one electrode continues.

The rising period control unit 823 allows the supply device 81 to supply lamp current having constant current and frequency, and voltage increasing from the initial term to the final term in the rising period T3 to the discharge lamp 5. As explained above, the rising period T3 is a period when discharge is generated between the tips of the pair of the electrodes EL and ER, and the current value of the lamp current supplied during the rising period T3 is set higher than the current value supplied during the starting period T2.

The steady lighting control unit 824 allows the supply device 81 to supply the lamp current having constant frequency and constant lamp power to the discharge lamp 5 during the steady lighting period T4.

Lighting Process

Figure 6:
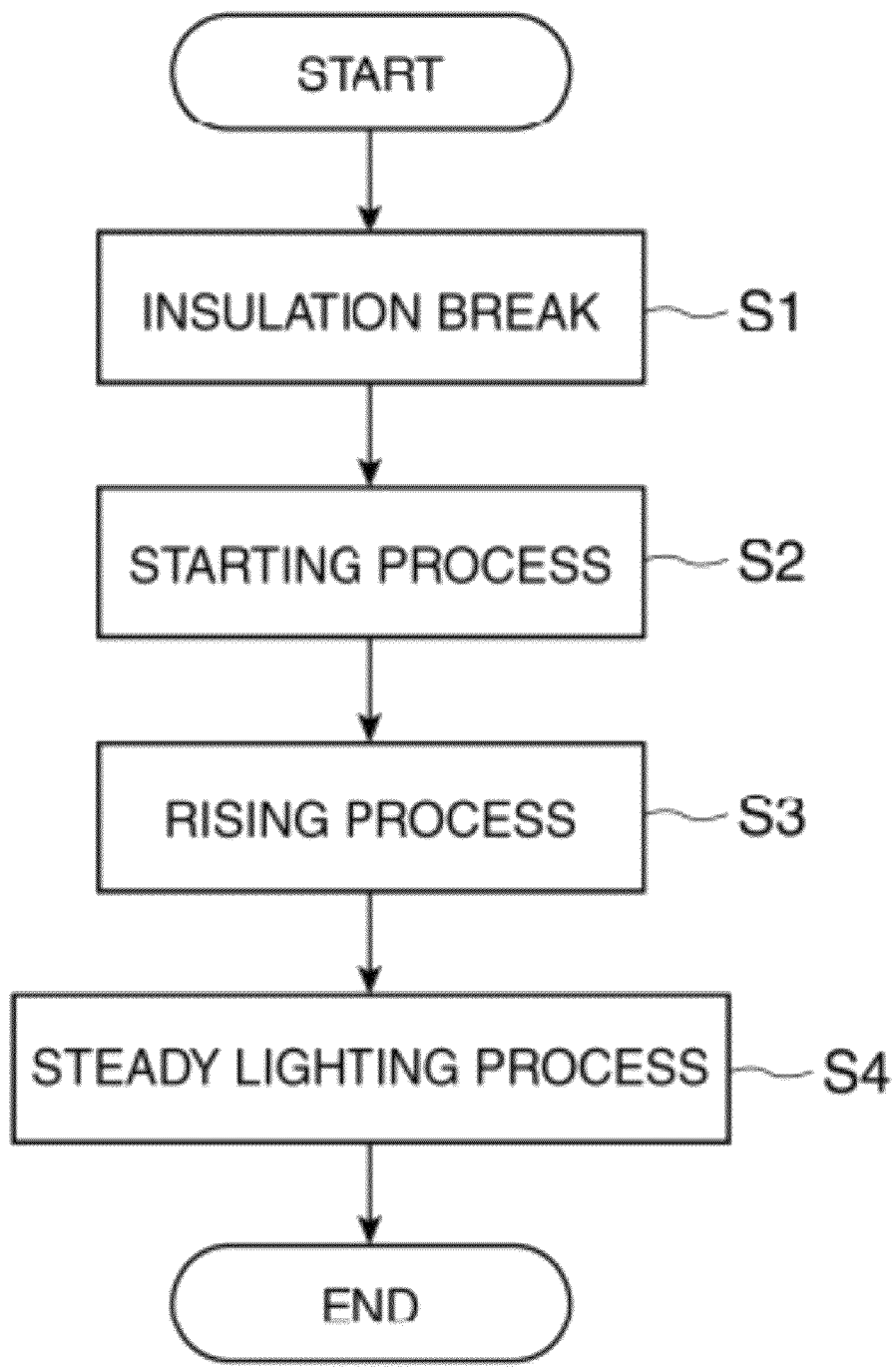
FIG. 6 is a flowchart showing lighting process performed by a control device according to the first embodiment.

FIG. 6 is a flowchart showing the lighting process of the discharge lamp 5 performed by the control device 82.

When receiving a signal requesting lighting of the discharge lamp 5 from the control unit 93, the control device 82 executes the lighting process including steps S1 through S4 shown in FIG. 6 to turn on the discharge lamp 5.

Step S1 is carried out during the insulation break down period T1. In step S1, the insulation break down control unit 821 outputs a starting signal to the supply deice 81 (particularly to the igniter circuit 813) and allows the supply device 81 to apply high-voltage pulse to the respective terminals 83 such that insulation between the electrodes EL and ER can be broken.

Step S2 corresponds to current supply step according to the invention, and carried out in the starting period T2 from insulation break down until start of stable discharge between the tips of the pair of the electrodes EL and ER (arc discharge). In step S2, the start control unit 822 allows the supply device 81 to supply AC current to the respective terminals 83 such that the half-cycle electricity quantity supplied to the terminal 83L becomes larger than the half-cycle electricity quantity supplied to the terminal 83R in the initial term of the starting period T2 as described above. In this case, the start control unit 822 initiates supply of the AC current with the terminal 83L operating as cathode.

The start control unit 822 decreases the half-cycle electricity quantity supplied to the terminal 83L and increases the half-cycle electricity quantity supplied to the terminal 83R as the term shifts from the initial term to the final term in the starting period T2.

Then, the start control unit 822 allows the supply device 81 to supply AC current to the terminals 83L and 83R such that the half-cycle electricity quantities supplied to the respective terminals 83L and 83R become equal in the final term of the starting period T2.

Steps S3 and S4 are carried out in the rising period T3 and the steady lighting period T4, respectively. In step S3, the rising period control unit 823 allows the supply device 81 to supply AC current to the respective terminals 83 in the manner described above. In step S4, the steady lighting control unit 824 similarly allows the supply device 81 to supply AC current to the respective terminals 83 in the manner described above. By this method, lighting of the discharge lamp 5 is stabilized.

According to the projector 1 in this embodiment, the following advantages can be offered.

(1) In the initial term of the starting period T2, the half-cycle electricity quantity supplied to the terminal 83L is larger than the half-cycle electricity quantity supplied to the terminal 83R. In this case, a number of electrons can be emitted from mercury adhering to the electrode EL, that is, mercury having low work function. Thus, the temperature of the electrode ER to which mercury does not adhere can be rapidly increased.

In the final term of the starting period, the half-cycle electricity quantities supplied to the respective terminals 83L and 83R become equal. Thus, the volume of electrons from the electrode ER having already started electrode emission becomes larger than that volume in the initial term of the starting period. By this method, the temperature of the electrode EL from which the adhering mercury has been evaporated can be rapidly increased.

As can be understood, the temperatures of the electrodes EL and ER can be immediately increased. Thus, the starting period T2 of the discharge lamp 5 can be shortened, and the lighting startability of the discharge lamp 5 can be improved. Moreover, damage to the discharge lamp can be reduced, and deterioration of the electrodes E can be avoided by reduction of the starting period T2. Thus, the life of the discharge lamp 5 can be increased. In this case, the light source device 411 need not be frequently replaced due to long life of the discharge lamp 5. Accordingly, labor required for maintenance of the projector 1 can be reduced.

(2) The half-cycle electricity quantity supplied to the terminal 83R increases as the term shifts from the initial term to the final term in the starting period T2. In this case, a number of electrons emitted from the electrode ER collide with the electrode EL exposed by evaporation of mercury adhering to the electrode EL according to the evaporation condition of the mercury. Thus, rising of the temperature of the electrode EL can be further accelerated, and increase in the temperatures of the respective electrodes EL and ER can be further promoted. Accordingly, the lighting startability of the discharge lamp 5 can be further improved.

(3) The frequency setting unit 8222 varies frequency of AC current supplied to the respective terminals 83L and 83R in the starting period T2. By this method, the half-cycle electricity quantities supplied to the respective terminals 83L and 83R can be easily determined. Thus, AC current supply to the terminals 83L and 83R can be easily controlled.

(4) The frequency set during the starting period T2 is higher than 5 Hz and lower than 500 Hz. In this case, damage given to the inner wall of the discharge lamp 5 can be prevented even when electrons emitted from one electrode continuously collide with the inner wall of the discharge lamp 5 as discussed above. Thus, deterioration of the discharge lamp 5 can be reduced. Moreover, asymmetric current (half-wave current) drive can be prevented by reduction of damage of the inner wall. Thus, current can be appropriately supplied to the respective electrodes EL and ER while further reducing deterioration of the discharge lamp.

(5) Light emitted from the light emission portion 511 toward the sub reflection mirror 52 is reflected toward the main reflection mirror 6 by the sub reflection mirror 52 covering the light emission portion 511 on the electrode ER side. Thus, generation of light not entering the lens array 412 can be prevented, and utilization efficiency of the light can be increased.

A larger half-cycle quantity of electricity can be supplied to the electrode EL to which mercury adheres than the half-cycle quantity of electricity supplied to the electrode ER to which mercury does not adhere in the initial term of the starting period T2 by connecting the terminal 83R to the electrode ER on the sub reflection mirror 52 side and connecting the terminal 83L to the opposite electrode EL.

Accordingly, the lighting startability of the discharge lamp 5 can be improved as explained above, and the usability of the discharge lamp 5 can be enhanced as well.

2. Second Embodiment

A projector according to a second embodiment is hereinafter described.

The projector in this embodiment has a structure similar to that of the projector 1. According to the projector 1, AC current having constant current and variable frequency, i.e., variable half-cycle width is supplied to the terminals 83 during the starting period T2 of the discharge lamp 5. According to the projector in this embodiment, however, AC current having constant frequency and variable half-cycle current is supplied to the terminals 83 during the starting period T2. The projector in this embodiment is different from the projector 1 in this point. In the following description, similar reference numbers are given to parts identical or substantially identical to those described above, and the same explanation is not repeated.

Figure 7:
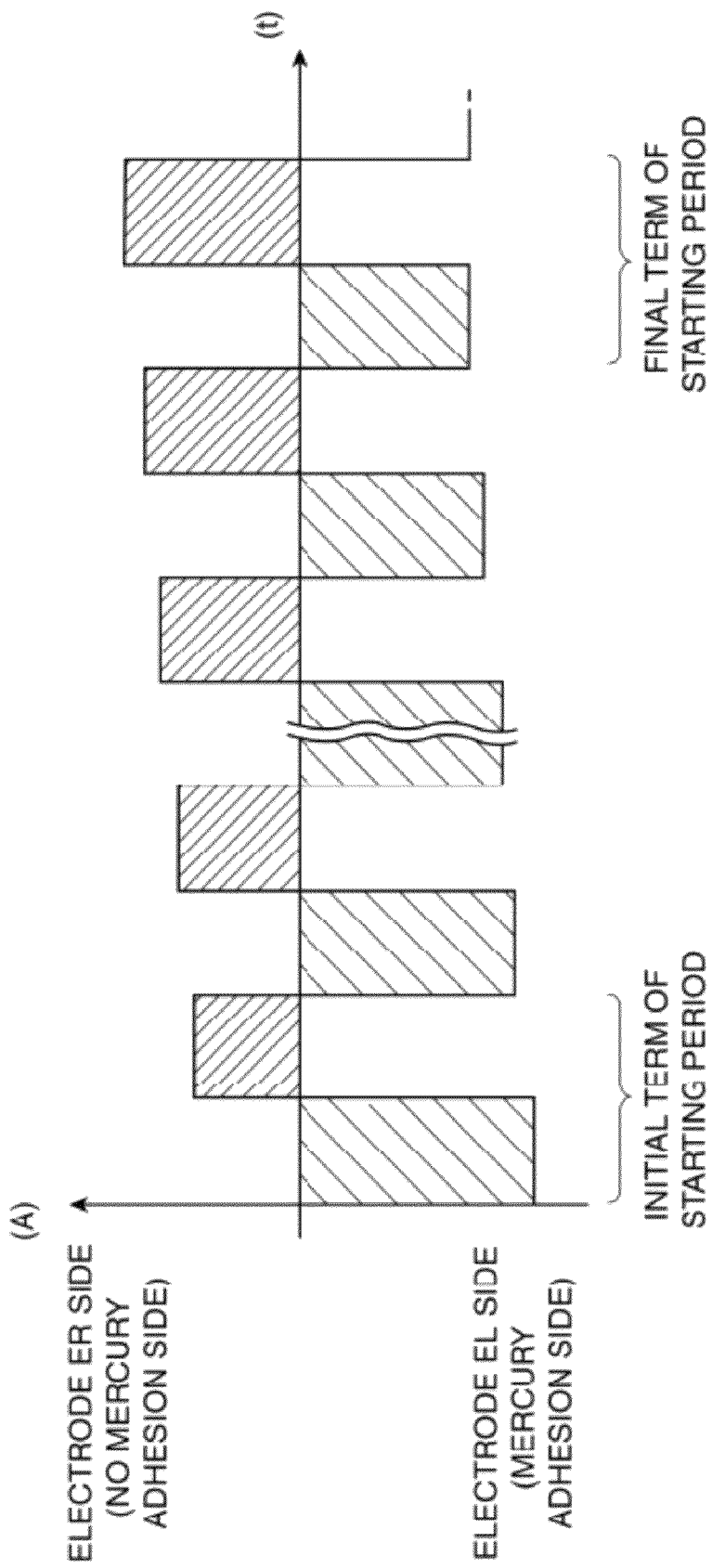
FIG. 7 shows waveform of current supplied during a starting period from a lighting device of a projector according to a second embodiment of the invention.

FIG. 7 shows waveform of current supplied to the terminals 83 of the projector during the starting period T2 in this embodiment.

Though not shown in the figure, the projector in this embodiment has a structure similar to that of the projector 1. The start control unit 822 included in the projector in this embodiment allows the supply device 81 to supply AC current having the waveform shown in FIG. 7 to the terminals 83 in step S2.

More specifically, supply of AC current set by the start control unit 822 is initiated under the condition that the terminal 83L is cathode. Similarly to the above embodiment, the AC current is set such that the half-cycle electricity quantity (indicated by oblique lines extending upward to the right in FIG. 7) on the cathode side (terminal 83L: cathode) becomes larger than the half-cycle electricity quantity (indicated by oblique lines extending downward to the right in FIG. 7) on the anode side (terminal 83R: cathode) in the initial term of the starting period T2. With elapse of time, the half-cycle electricity quantity decreases on the cathode side, and increases on the anode side. When the term reaches the final term of the starting period T2, the respective half-cycle electricity quantities become equal on both sides.

For more detail, the frequency setting unit 8222 sets the frequency of the AC current supplied during the starting period T2 at a frequency higher than 5 Hz and lower than 500 Hz, and keeps the frequency constant throughout the starting period T2. However, the current setting unit 8221 sets the current value of the AC current such that the current becomes higher on the cathode side and lower on the anode side in the initial term of the starting period T2.

Then, the current setting unit 8221 decreases the current value on the cathode side and increases the current value the anode side as the term shifts from the initial term to the final term of the starting period T2.

Then, the current setting unit 8221 sets the AC current such that the half-cycle current values become equal on both sides at the final term of the starting period T2. As a result, the half-cycle electricity quantities supplied to the terminals 83L and 83R become equal in the final term of the starting period T2.

When the AC current is supplied to the respective terminals 83 in this manner during the starting period T2, electrons are emitted from mercury having low work function toward the electrode ER during the initial term of the starting period T2. In this stage, the half-cycle electricity quantity supplied to the electrode EL is larger than the half-cycle electricity quantity supplied to the electrode ER. Thus, the temperature of the electrode ER can be rapidly increased.

When the temperature of the electrode ER reaches a temperature appropriate for emission of electrons, electrons emitted from the electrode ER collide with mercury adhering to the electrode EL. As a result, the temperature of the mercury rises and the mercury evaporates. However, since the temperature of the electrode EL is low, emission of electrons from the electrode ER is promoted by increasing the half-cycle electricity quantity supplied to the electrode ER as the term shifts from the initial term to the final term of the starting period T2. By this step, the temperature increase of the electrode EL accelerates.

When both the electrodes EL and ER reach a temperature appropriate for electron emission in the final term of the starting period T2, the half-cycle electricity quantities supplied to the electrodes EL and ER become equal. Thus, the condition can easily shift to discharge between the tips of the electrodes EL and ER.

According to the projector in this embodiment, the following advantage can be offered as well as the advantages (1), (2), (4), and (5) of the projector 1.

(6) The half-cycle current values of AC current supplied to the terminals 83L and 83R are varied during the starting period T2 by the function of the current setting unit 8221. Thus, the half-cycle electricity quantities supplied to the respective terminals 83L and 83R can be easily determined. Accordingly, AC current supplied to the terminals 83L and 83R can be easily controlled.

3. Modifications of Embodiments

The invention is not limited to the embodiments described herein, and therefore modifications, improvements and the like may be made without departing from the scope and spirit of the invention.

According to the respective embodiments, the half-cycle electricity quantity supplied to the terminal 83L decreases and the half-cycle electricity quantity supplied to the terminal 83R increases as the term shifts from the initial term to the final term of the starting period T2. However, the half-cycle electricity quantity supplied to one terminal may be adjusted to the half-cycle electricity quantity supplied to the other terminal at a predetermined time in the starting period T2. That is, the half-cycle electricity quantity need not be varied step by step during the starting period T2. Alternatively, the half-cycle electricity quantity supplied to the terminal 83L may be kept constant during the starting period T2, and the half-cycle electricity quantity supplied to the terminal 83R may be increased from the initial term to the final term of the starting period T2.

According to the first embodiment, AC current having constant current value and variable frequency (half-cycle width) is supplied to the terminals 83 in the starting period T2. According to the second embodiment, AC current having constant frequency and variable current value is supplied to the terminals 83 in the starting period T2. However, at least either current value or frequency needs to be determined, and both current and frequency may be varied. Voltage may be changed if possible.

According to the respective embodiments, the frequency of the AC current supplied during the starting period T2 is higher than 5 Hz and lower than 500 Hz. However, the frequency may be determined arbitrarily as long as damage to the inner wall of the light emission portion 511 can be prevented.

According to the respective embodiments, the sub reflection mirror 52 is provided on the sealing portion 513 side (i.e., electrode ER side) of the light emission portion 511. However, the sub reflection mirror 52 maybe eliminated.

According to the respective embodiments, the projector 1 includes the three liquid crystal panels 442R, 442G, and 442B. However, the invention is applicable to a projector having two or smaller number, or four or larger number of liquid crystal panels.

According to the respective embodiments, the optical unit 4 has substantially L shape in the plan view. However, the optical unit 4 may have substantially U shape in the plan view, for example.

According to the respective embodiments, the light transmission type liquid crystal panels 442 each of which has separate light entrance surface and light exit surface have been used. However, reflection type liquid crystal panels each of which has one light entrance and exit surface may be used.

According to the respective embodiments, the projector 1 having the liquid crystal panels 442 as light modulation devices has been discussed. However, other light modulation devices may be used as long as they form optical images by modulating entering light according to image information. For example, the invention is applicable to a projector including light modulation device other than liquid crystal such as a device using micromirror. When this type of light modulation device is used, the light entrance side and light exit side polarization plates 443 and 444 can be eliminated.

According to the respective embodiments, the light source device 411 having the discharge lamp 5 and the lighting device 8 is included in the projector 1. However, the light source device 411 may be contained in an illumination device such as desk lamp. The lighting device 8 may be used as one unit device.

The invention is appropriate for a lighting device which lights a discharge lamp.

The entire disclosure of Japanese Patent Application No. 2008-308558, filed Dec. 3, 2008 is expressly incorporated by reference herein.

What is claimed is:

1. A lighting device that lights a discharge lamp which contains a pair of electrodes and light emission substance including mercury, comprising:
    a first terminal connected with the electrode to which the mercury easily adheres as one of the pair of the electrodes;
    a second terminal connected with the electrode to which mercury is difficult to adhere as the other electrode;
    a setting unit which sets AC current supplied to the first and second terminals in a starting period from insulation break down of the discharge lamp until start of discharge between the tips of the pair of the electrodes; and
    a supplying unit which supplies AC current set by the setting unit to the first and second terminals,
    the setting unit setting AC current such that the half-cycle electric quantity supplied to the first terminal becomes larger than the half-cycle electric quantity supplied to the second terminal in the initial term of the starting period under the condition in which the first terminal initially operates as cathode, and that the half-cycle electricity quantities supplied to the first and second terminals become substantially equal in the final term of the starting period.

2. The lighting device according to claim 1, wherein the setting unit increases the half-cycle electricity quantity supplied to the second terminal step by step during the starting period.

3. The lighting device according to claim 1, wherein the setting unit sets the half-cycle electricity quantity of the AC current supplied from the supplying unit while controlling at least either frequency or current value of the AC current.

4. The lighting device according to claim 1, wherein the frequency of the AC current set by the setting unit is higher than 5 Hz.

5. The lighting device according to claim 1, wherein:
    the discharge lamp includes
        a light emission portion into which the pair of the electrode and the light emission substance are sealed, and
        a reflection member which covers the end of the light emission portion on the side where one of the pair of the electrodes is disposed; and
    the first terminal is connected with the electrode disposed on the side opposite to the side where the reflection member is provided.

6. A light source device comprising:
    a discharge lamp which contains a pair of electrodes and light emission substance including mercury; and
    the lighting device according to claim 1.

7. The light source according to claim 6, wherein the setting unit increases the half-cycle electricity quantity supplied to the second terminal step by step during the starting period.

8. The light source according to claim 6, wherein the setting unit sets the half-cycle electricity quantity of the AC current supplied from the supplying unit while controlling at least either frequency or current value of the AC current.

9. The light source according to claim 6,
wherein the frequency of the AC current set by the setting unit is higher than 5 Hz.

10. The light source according to claim 6, wherein:
the discharge lamp includes
a light emission portion into which the pair of the electrode and the light emission substance are sealed, and
a reflection member which covers the end of the light emission portion on the side where one of the pair of the electrodes is disposed; and
the first terminal is connected with the electrode disposed on the side opposite to the side where the reflection member is provided.

11. A projector comprising:
the light source device according to claim 6;
a light modulation device which modulates light emitted from the light source device according to image information; and
a projection device which projects the modulated light.

12. The projector according to claim 11, wherein the setting unit increases the half-cycle electricity quantity supplied to the second terminal step by step during the starting period.

13. The projector according to claim 11, wherein the setting unit sets the half-cycle electricity quantity of the AC current supplied from the supplying unit while controlling at least either frequency or current value of the AC current.

14. The projector according to claim 11, wherein the frequency of the AC current set by the setting unit is higher than 5 Hz.

15. The projector according to claim 11, wherein:
the discharge lamp includes
a light emission portion into which the pair of the electrode and the light emission substance are sealed, and
a reflection member which covers the end of the light emission portion on the side where one of the pair of the electrodes is disposed; and
the first terminal is connected with the electrode disposed on the side opposite to the side where the reflection member is provided.

16. A discharge lamp lighting method for lighting a discharge lamp including a light emission portion which contains a pair of electrodes and light emission substance including mercury, comprising the steps of:
supplying AC current to terminals such that the half-cycle electric quantity supplied to one of the terminals connected with the electrode to which mercury easily adheres becomes larger than the half-cycle electric quantity supplied to the other terminal in the initial term of a starting period from insulation break down of the discharge lamp until start of discharge between the tips of the pair of the electrodes under the condition in which the one terminal initially operates as cathode, and that the half-cycle electricity quantities supplied to the respective terminals become substantially equal in the final term of the starting period.

\* \* \* \* \*